Feb. 15, 1955 H. GAINES, JR 2,702,198
DRAWBAR ASSEMBLY
Filed Sept. 3, 1953 2 Sheets-Sheet 1

Harry Gaines, Jr.
INVENTOR.

BY
Attorneys

Feb. 15, 1955  H. GAINES, JR  2,702,198
DRAWBAR ASSEMBLY
Filed Sept. 3, 1953  2 Sheets-Sheet 2

Harry Gaines, Jr.
INVENTOR.

United States Patent Office 2,702,198
Patented Feb. 15, 1955

2,702,198

DRAWBAR ASSEMBLY

Harry Gaines, Jr., Clovis, N. Mex.

Application September 3, 1953, Serial No. 378,239

5 Claims. (Cl. 280—489)

This invention relates to a drawbar assembly and more specifically provides an attachment for conventional tractors whereby an implement is secured adjacent the rear axle of the tractor for pulling the implement.

An object of this invention is to provide a drawbar assembly wherein a portion of the force necessary to pull the implement attached to the drawbar is transferred to a downward force on the traction wheels of the tractor thereby affording the driving wheels of the tractor with a better traction grip.

Another object of this invention is to provide a drawbar assembly having a resilient spring associated with a pivot member for transferring a portion of a horizontal pull force into a downward force.

A further object of this invention is to provide a drawbar assembly with means for adjusting the amount of downward force transferred from the horizontal pulling force.

Yet another object of this invention is to provide a drawbar assembly which may be secured to a conventional existing tractor and may be used for pulling various implements.

A still further object of this invention is to provide a drawbar assembly which is simple in construction, simple in operation, sturdy and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
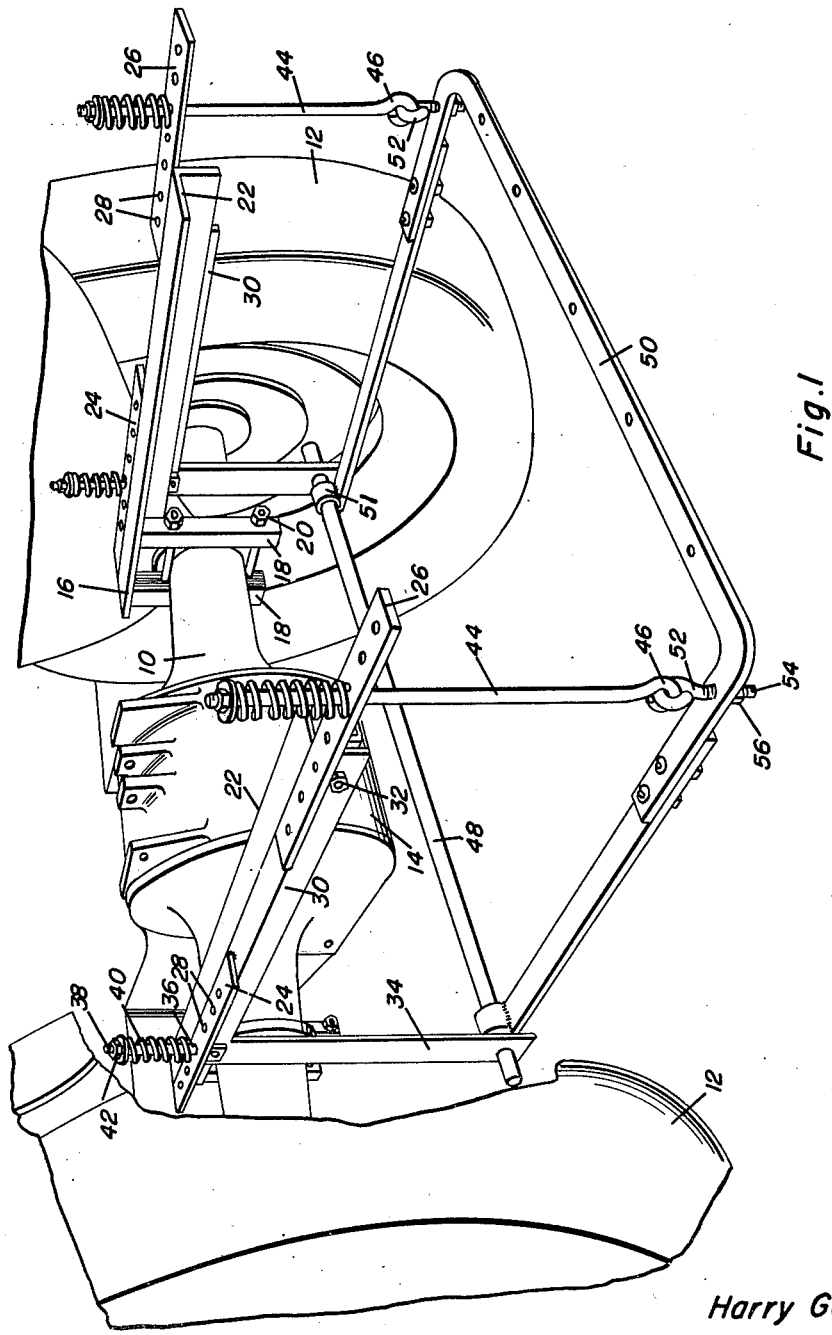
Figure 1 is a perspective view showing the drawbar assembly of this invention secured to the rear axle of a tractor.

Referring now more specifically to the drawings, it will be seen that the drawbar assembly of this invention is attached to a conventional tractor axle 10 having ground engaging driving wheels 12 and a suitable differential 14, all of which are found in most modern type tractors.

The drawbar assembly of this invention includes an identical assembly on each side of the differential 14 and a description of one-half of the device will be sufficient to explain the operation of the device. A bracket 16 is secured to the axle 10 by the use of a pair of vertical bars 18 having a pair of clamp bolts 20 therethrough and straddling the axle 10 for clamping the bracket 16 rigidly to the axle 10. Extending rearwardly from the bracket 16 is a rigid angle arm member 22 having an elongated member 24 at its front end and an elongated member 26 at its rearward end with the members 24 and 26 having a plurality of longitudinally spaced apertures 28 for a purpose described hereinafter. Adjacent the rear end of the angle arm member 22 is pivotally attached an L-shaped member 30 by a suitable pivot bolt 32 and it will be noted that the L-shaped member 30 has one leg generally parallel to the angle arm 22 and a depending leg 34 at right angles thereto and extending vertically downward to a point spaced below the axle 10 and adjacent the rear portion thereof. Pivotally secured to the juncture of the L-shaped leg members is an elongated rod 36 having a threaded end portion 38 for insertion in selective apertures 28. A compression spring 40 surrounds the rod 36 and abuts the upper surface of the extension plate 24 and a nut and washer 42 engage the threaded portion 38 and the upper end of the spring 40 thereby providing an adjustment and means for removing the spring from the rod. A second elongated rod 44 having an eye member 46 at its lower end is received in selective apertures 28 on extension plate 26 and the upper end of the rod 44 is constructed the same as rod 36 wherein the rod has a threaded portion 38 with a surrounding spring 40 and a retaining nut 42. It will be noted that the upper ends of rods 36 and 44 may be placed in selective apertures 28 in extension plates 24 and 26 thereby providing an adjustment of the distance between the rods 36 and 44. A freely rotatable bar 48 is journaled in suitable apertures in the lower ends of the depending leg portion 34 and extends between the pair of depending leg members 34 at a point below the axle 10 of the tractor and parallel thereto. A U-shaped drawbar 50 having an eye member 51 at the remote ends of the legs of the U-shaped member is pivotally engageable over the rotatable bar 48. An eye member 52 engageable with the eye 46 of rod 44 has a threaded portion 54 extending through an aperture adjacent the juncture of the bight portion and the leg portions of the drawbar 50 and having a suitable nut 56 thereon for securing the drawbar 50 to the elongated rod 44 thereby supporting the drawbar 50 in substantially horizontal relation.

Figure 2:
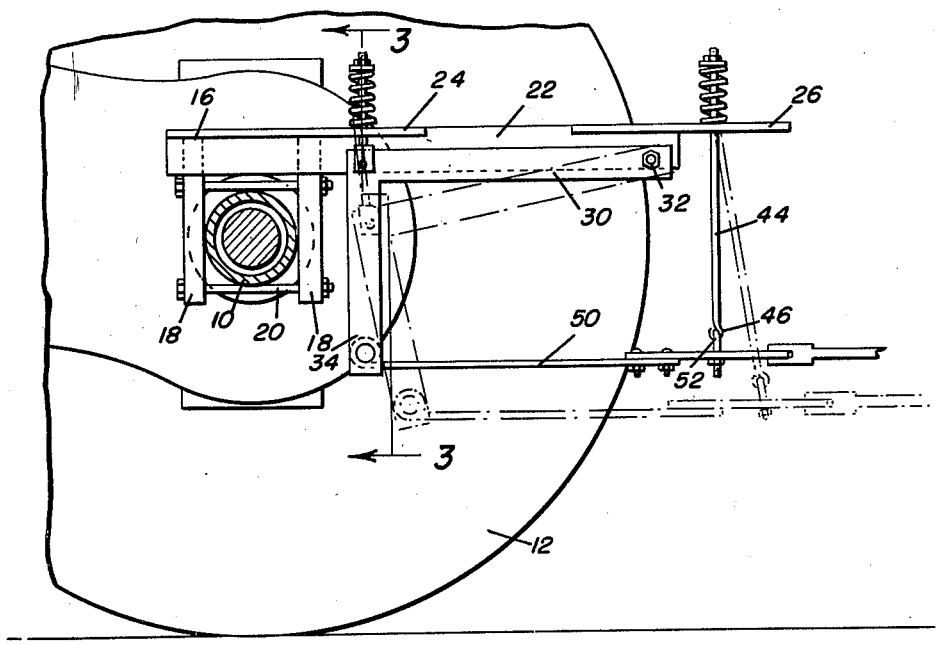
Figure 2 is a side elevational view with the tractor axle in section showing details of the drawbar assembly with the position as shown in phantom being the position the drawbar takes upon exerting a horizontal pull.
Figure 3:
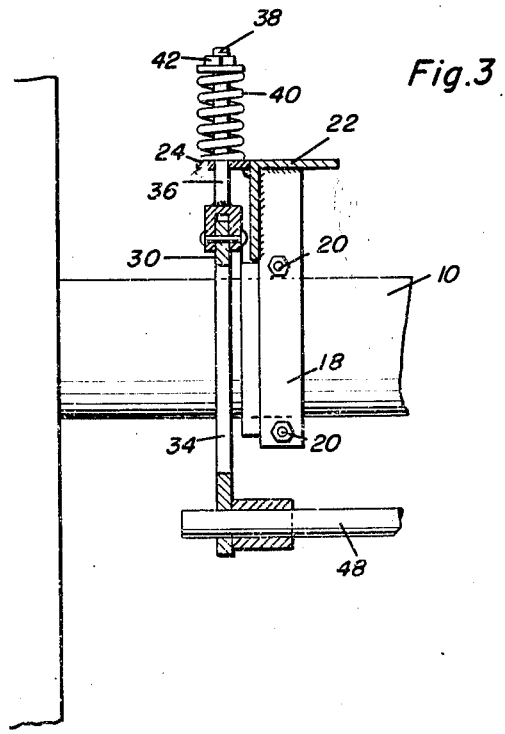
Figure 3 is a transverse, vertical section taken substantially along section line 3—3 of Figure 2 showing details of the construction of the resilient spring and pivoted member.

The operation of the device will be readily understood. The pair of brackets 16 are secured to opposite ends of the axle 10 by applying the spaced members 18 over the axle 10 and strapping the axle with clamp bolts 20 thereby securing the bracket 16 to the axle. The L-shaped members 30 are then placed upon the rearwardly extending portion 22 by the use of pivotal bolts 32 and the rod 48 and the U-shaped drawbar assembled thereon is suitably positioned between the depending leg portions 34 of the L-shaped member 30. The nuts 42 and the springs 40 are removed from the rods 36 and 44 respectively, and the threaded end portions 38 of the rods are inserted through suitable apertures 28 in the extension plates 24 and 26 and the springs are then placed over the projecting end portion of the rods 36 and 44 therein fastening the rods to the extension plates. Obviously, the eye members 46 and 52 are in engagement and the threaded portion 54 of the eye member 52 is extended through an aperture in the U-shaped drawbar and a suitable nut is placed thereon for securing the drawbar in substantially horizontal position. When an implement (not shown) is secured to the drawbar 50 and the tractor moved ahead, a horizontal pull on the drawbar 50 will cause the L-shaped member 30 to rotate about the pivot axis formed by the bolt 32 thereby moving the L-shaped member to a position substantially as shown in phantom in Figure 2 thereby compressing the spring 40 and exerting a downward force upon the axle 10 of the vehicle thereby giving the vehicle an added traction on the supporting surface. The proportion of the horizontal force transmitted to a vertical downward force is dependent upon the specific orientation of the pivot axis 32 and the location of the distance between the rods 36 and 44. Following the line of forces from the axle of the tractor through the drawbar appears to be self-explanatory and the U-shaped pivotal connection between the juncture of the two legs of the L-shaped member allows the rod 36 to pivot relative to the L-shaped member 30. Obviously, the rod 44 may pivot relative to the drawbar 50 by the use of the double eye 46 and 52 as the apertures 28 in the arms 22 are sufficiently large to permit the rods 36 and 44 to move to the angular position shown in phantom in Figure 2. The drawbar assembly of this invention may be employed with any conventional tractor for pulling an implement such as a plow or lister wherein there is usually a large amount of horizontal force necessary to move the implement which sometimes causes the tractor to spin and lose traction. The transmission of a portion of the horizontal force to a vertical downward force increases the frictional grip between the wheel 12 and the supporting surface which the tractor or vehicle moves over. The specific material used in the make up of this drawbar assembly may be any conventional stock material which meets the specifications as determined by the various loads to be transmitted through the drawbar.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A drawbar assembly for attachment to the rear axle of a tractor comprising a pair of supporting brackets adapted to be attached to the rear axle, a rearwardly extending member on each bracket, an L-shaped member having one of its legs pivotally secured adjacent the rear end of said extending member, a second L-shaped member pivotally secured to the other extending member, a freely rotatable bar connecting the ends of the other legs of said L-shaped members, a drawbar pivotally secured to said bar, resilient means connecting said drawbar and the rear ends of said extending members, and resilient means connecting the juncture of the L-shaped members to the forward ends of the extending members wherein said L-shaped member will pivot about its pivotal connections when a horizontal pull is exerted upon the drawbar thereby exerting a vertical force on the extending members through the resilient connecting means.

2. The structure as defined in claim 1 wherein said resilient connecting means includes an elongated rod having a threaded end portion, a compression spring surrounding said threaded portion and abutting the upper surface of said extending member, and a nut threaded onto said rod and abutting the spring for adjusting the tension of said spring.

3. The structure as defined in claim 1 wherein said resilient connecting means are adjustable along the longitudinal length of said extending member for varying the force which urges the tractor axle downwardly.

4. The structure as defined in claim 1 wherein said connecting bar is spaced downwardly from said extending member and said drawbar is spaced rearwardly of said connecting bar, said drawbar normally spaced directly under the rearmost ends of said extending members.

5. A drawbar assembly comprising mounting means for attachment to a vehicle, a drawbar for attaching an implement behind the vehicle, and means connecting said drawbar to said mounting means, said connecting means including means for transferring a portion of the horizontal pull on the drawbar to a downward vertical force for urging the vehicle driving wheels toward the ground surface, said transferring means including an L-shaped member having a horizontal leg pivotally secured at its rearmost end to the mounting means and a vertical leg depending from the forward end of the horizontal leg and pivotally attached to the drawbar, and spring means interconnecting the L-shaped member and the mounting means for resisting downward pivotal movement of the L-shaped member when a horizontal pull is exerted by said drawbar thereby transmitting a portion of the horizontal pull on the drawbar to a downward pull on the vehicle.

References Cited in the file of this patent

UNITED STATES PATENTS

| 1,044,903 | Meyers | Nov. 19, 1912 |
| 1,374,271 | Alden | Apr. 12, 1921 |
| 1,512,611 | Konetsky | Oct. 21, 1924 |
| 2,092,584 | Mott | Sept. 7, 1937 |
| 2,092,597 | Benjamin et al. | Sept. 7, 1937 |
| 2,232,407 | Riesterer | Feb. 18, 1941 |
| 2,540,677 | Kandt et al. | Feb. 6, 1951 |

FOREIGN PATENTS

| 302,391 | Great Britain | Dec. 17, 1928 |